Aug. 13, 1957  R. F. LEVERENZ  2,802,766
METHOD OF MANUFACTURING A LAMINATED ARTICLE
Filed Feb. 11, 1954

Roy F. Leverenz
INVENTOR.

BY *Clarence A. O'Brien*
and *Harvey B. Jacobson*
Attorneys

2,802,766
METHOD OF MANUFACTURING A LAMINATED ARTICLE

Roy F. Leverenz, Inyokern, Calif.

Application February 11, 1954, Serial No. 409,552

1 Claim. (Cl. 154—110)

This invention relates generally to a method of molding and more particularly to a process of molding using internal pressure to form a laminated article.

The primary object of the present invention resides in the provision of a process of molding using the internal pressure of core material whereby a sandwich construction of reinforced plastic is produced having a large core mass of suitable characteristics protected externally by a shell of desired hardness, strength and durability.

A further object of the invention resides in the process of molding utilizing internal pressure in which comparatively simple molds can be utilized and in which various materials may be employed.

A yet further object of the invention resides in the provision of a laminated article having a large core mass of suitable rigidity or flexibility which is protected externally by a shell of satisfactory hardness, resiliency, strength and durability.

Still further objects of the invention reside in the provision of a process of molding a laminated article which is simple to employ, inexpensive to utilize, and highly efficient in production.

These, together with the various ancillary objects and features of the invention which will become apparent as the following description proceeds, are attained by this invention, the method and apparatus utilized in the invention being illustrated in the accompanying drawings, by way of example only, wherein.

Figure 1:
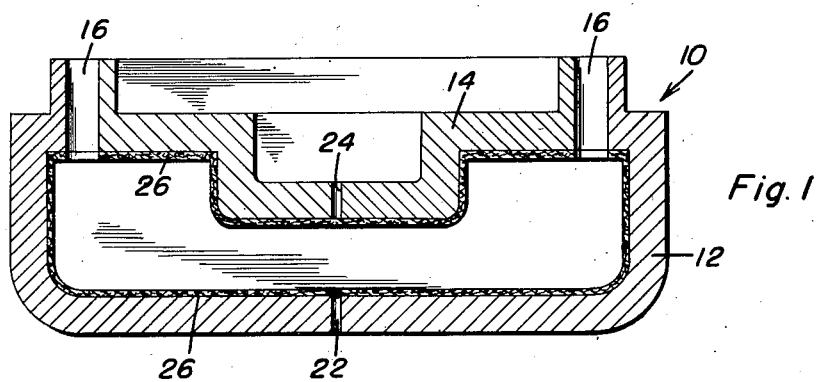
Figure 1 is a sectional view of the male and female mold sections with the shell applied thereover.
Figure 2:
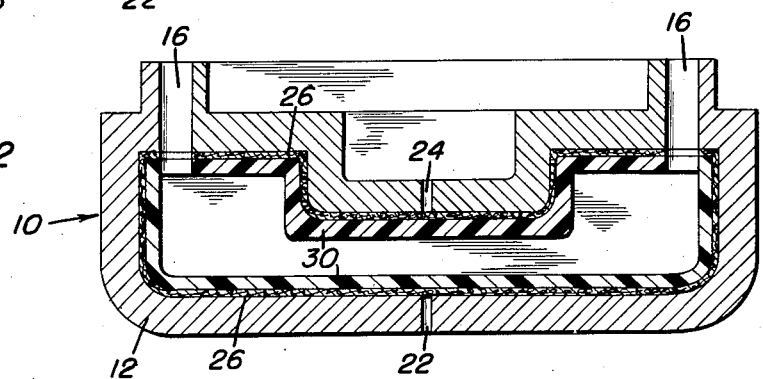
Figure 2 is a sectional detail view of the mold illustrating the manner in which the barrier laminator is applied over the shell.
Figure 3:
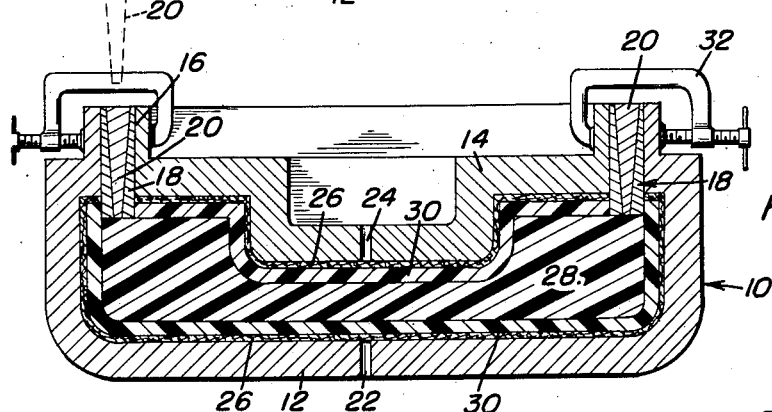
Figure 3 is a sectional detail view illustrating the male and female sections of the mold in a secured position with core material received in the mold.

With continuing reference to the accompanying drawings wherein like reference numerals designate similar parts throughout the various views, reference numeral 10 generally designates a mold which is constructed from a female mold section 12 and a male mold section 14, of desired configuration. Between the male and female mold sections 14 and 12 there is provided passageways 16 within which juncture strips 18 can be positioned having blow-out plugs 20. Obviously, when using small molds the juncture strips 18 and blow-out plugs 20 can be eliminated by joining the molds together so that there is considerable resistance, though not an air-tight joint, at the juncture of the two mold section.

Air channels 22 and 24 are formed in the mold sections 12 and 14 for the purpose of providing means for withdrawing excess resin and for applying compressed air to the mold sections in order to remove the mold sections from position about the molded article when the function of the mold sections 12 and 14 has been completed. Obviously, the mold sections 12 and 14 can be formed in any suitable number of parts and of the configuration necessary to form the desired finished product.

In forming the laminated article, a shell 26 is first positioned on the mold sections 12 and 14. This shell is applied after preparing the mold with suitable release agents and may consist of glass mat or glass cloth which is impregnated with resin or dry (not impregnated) and which is laid upon and in the mold sections 12 and 14. If the glass mat or glass cloth is laid up dry, prepared resin is applied by pouring, brushing or spraying. The mat or cloth is then worked to remove air bubbles and smoothed out in order to make the lay-up of the glass mat or cloth conform to the contours to the mold.

The resin used in the shell may be a polyester, melamine, phenolic or other suitable material and it is to be recognized that other suitable and similar material can be utilized in lieu of glass fiber or cloth.

After the shell has been positioned on and over the male and female mold sections 14 and 12, a barrier laminator is placed over the shell material on each mold and carefully smoothed out to conform to the mold surface. The barrier laminator is of flexible material that is compatible with both the resin in the shell and the resin which is to form the core 28. The barrier laminator is generally designated by reference numeral 30 and has the function of preventing the resin in the shell 26 from reacting with the material forming the core 28 while also preventing the material of the core 28 from reacting with the shell while further providing a strong bond between the shell 26 and the core 28.

An example of the barrier laminator is a sheet of finely woven glass cloth impregnated with a compatible resin and cured. The term "compatible resin" refers to a material compatible with the polyester, melamine, or phenolic resin used in the shell as hereinbefore set forth. Another example would be a sheet material formed of dry sheets of glass cloth bonded to a flexible sheet of finely woven glass cloth impregnated with a resin. In this example a rough surface of glass fiber is presented to the resin in the shell 26 and in the core 28, which surface is permeated with these resins in the molding process and while curing.

It may be necessary to fasten the barrier laminator to the male mold section 14 in order to prevent the lay up from sagging when the mold is inverted and placed within the female mold section 12. It may also be necessary to fasten the barrier laminator to the outside of the female mold also depending upon the shape of the mold and the amount of lay up material necessary for the shell 26 and barrier laminator 30. Further the barrier laminator and lay up may be supported by thin plastic stays sprung in and held by retainer clips or may be extended beyond the mold surface and fastened to the mold with clips for fastening strips.

After the barrier laminator 30 has been applied on the male and female mold sections the plastic core material 28 is mixed and a definite amount is poured into the cavity of the female mold section 12. The male mold section 14 is then inverted and placed in position over the female mold and the two are clamped together. A suitable means such as the clamps 32 may be utilized to hold the male and female mold sections in position.

Figure 4:
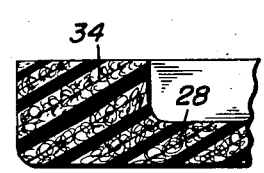
Figure 4 is a sectional detail view illustrating core material as reinforced with fibers.

After the plastic material forming the core 28 has been poured into the mold cavity, foaming results as a result of chemical action and in so doing the material expands creating pressure against the barrier laminator 30 and against the shell 26 thus assuring that the barrier laminator 30 will be bonded to the core material 28 and that the barrier laminator 30 will be laminated to the shell 26. It is to be realized that glass fibers 34 or other suitable reinforcing material may be incorporated in the core material 28 as is shown in Figure 4, if desired, and these glass fibers will be thus coated with resin due to the foaming action. Further, air bubbles will be dissipated and the glass fibers will be properly dispersed.

In the case of small molds excess air and excess foam under pressure can escape between the mold sections without damage to the molds. However, for larger mold sections the blow-out plugs 20 may be pushed outwardly and the excess gas and core material can then escape.

After the laminated article is allowed to cure for a suitable period of time within the mold the upper and lower parts of the shell may be joined by laminating resin impregnated mat or cloth over the mold junctures and suitable finishing operations may then be utilized to complete the article. It is to be realized that the mold sections may be removed using compressed air through the ducts 22 and 24.

It is to be noted that the rigid article can be formed when the shell and core are formed and cured in the same operation. The curing process may take place during the time when the article is within the mold or may, due to the material from which the core and shell are constructed take place after the laminated article has been removed from the mold. Because of the rigidity that is largely supplied by the core 28 a lesser amount of shell material is necessary for forming the shell 26 thus saving weight and cost of the finished article.

It is to be recognized that a resilient body may be formed by internal pressure using as a core material a resilient material such as foamed latex rubber, foamed latex plastic, rubber, or a resilient mat of glass or other fibers. This core material may be compressed and positioned in the female mold on top of the barrier laminator and shell layer. The upper section of the mold will then maintain the deformed core in a compressed and deformed condition so that the core will continue to apply pressure to the barrier laminator 30 and the shell 26 in order to laminate the shell 26 to the barrier laminator 30 and the barrier laminator 30 to the core 28. It is to be recognized that there will be no necessity for the blow-out plugs 20 or the juncture pieces 18 when the core of the resilient material is utilized. The resiliency of the core will then shape the barrier laminator and the shell 26 as desired.

If it is desired to fabricate the article with the core in a state of deformation so that latent resilience is built in permanently, then pressure resulting from only part of the deformation is used to shape the shell and provide the proper laminating pressure. If it is desired to fabricate the article with no deformation permanently in the core 28 all of the resilience is utilized in accomplishing the pressure forming of the shell 26.

After the article is cured by the necessary and suitable manner dependent upon the material from which the article is formed, it may be removed from the molds and any further curing and finishing operations may then be completed.

Since from the foregoing, the process comprising the present invention may be readily understood, further description is believed to be unnecessary.

However, since numerous modifications will readily occur to those skilled in the art after a consideration of the foregong specification and accompanying drawings, it is not intended to limit the invention to the precise process and article formed, but all suitable modifications and equivalents may readily be resorted to which fall within the scope of the appended claim.

What is claimed as new is as follows:

The method of manufacturing a laminated article comprising a core, a barrier layer completely surrounding said core and an outer shell surrounding said barrier layer; which comprises the steps of applying a shell of a desired thickness containing an uncured resin to the male and female mold sections of a mold, positioning over said shell a barrier laminator containing a cured resin which is compatible with the resin of said shell but which is of a different material from the material of said shell; positioning the male mold section within the female mold section and securing the male mold section to said female mold section; introducing into the space between the male and female mold sections a core material comprising a foaming resin which is compatible with the resin of said barrier laminator with said barrier laminator preventing chemical reaction between said shell and said foaming core material; foaming said foaming resin to produce pressure on said barrier laminator to simultaneously laminate said core material to said barrier laminator material and said barrier laminator material to said shell; simultaneously curing said core material and said outer shell, and then removing said male mold section from said female mold section and said laminated article from said mold.

References Cited in the file of this patent

UNITED STATES PATENTS

| | | |
|---|---|---|
| 1,370,666 | Novotny | Mar. 8, 1921 |
| 1,431,471 | Lehr | Oct. 10, 1922 |
| 1,708,059 | Griffiths | Apr. 9, 1929 |
| 1,979,691 | Jackson | Nov. 6, 1934 |
| 2,106,840 | Gould | Feb. 1, 1938 |
| 2,206,078 | Cunnington | July 2, 1940 |
| 2,216,999 | Bacon | Oct. 8, 1940 |
| 2,227,212 | Beck | Dec. 31, 1940 |
| 2,377,846 | Dreyfus et al. | June 5, 1945 |
| 2,414,125 | Rheinfrank | Jan. 14, 1947 |
| 2,495,640 | Muskat | Jan. 24, 1950 |
| 2,614,059 | Cooper | Oct. 14, 1952 |
| 2,639,252 | Simon et al. | May 19, 1953 |
| 2,642,920 | Simon et al. | June 23, 1953 |
| 2,686,747 | Wurtz et al. | Aug. 17, 1954 |
| 2,690,987 | Jeffries et al. | Oct. 5, 1954 |
| 2,695,256 | De Olloqui et al. | Nov. 23, 1954 |
| 2,728,702 | Simon et al. | Dec. 27, 1955 |

FOREIGN PATENTS

| | | |
|---|---|---|
| 658,242 | Great Britain | Oct. 3, 1951 |